D. McKANNA.
Hand-Seeder.

No. 55,517.  Patented June 12, 1866

Witnesses:
C. N. Drury
P. J. Dodge

Inventor:
David McKanna
By M. Dodge
Atty

UNITED STATES PATENT OFFICE.

DAVID McKANNA, OF MADISON, WISCONSIN.

IMPROVEMENT IN HAND CORN-PLANTERS.

Specification forming part of Letters Patent No. 55,517, dated June 12, 1866.

*To all whom it may concern:*

Be it known that I, DAVID McKANNA, of Madison, in the county of Dane and State of Wisconsin, have invented certain new and useful Improvements in Corn-Planters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in a novel arrangement of devices for operating the seed-slide and in a novel construction and arrangement of the parts.

Figure 1:
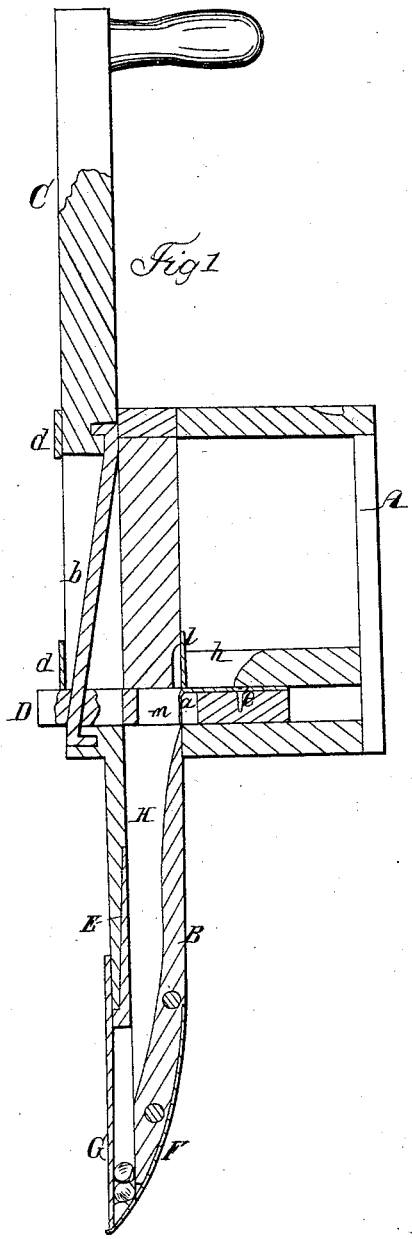
Figure 2:
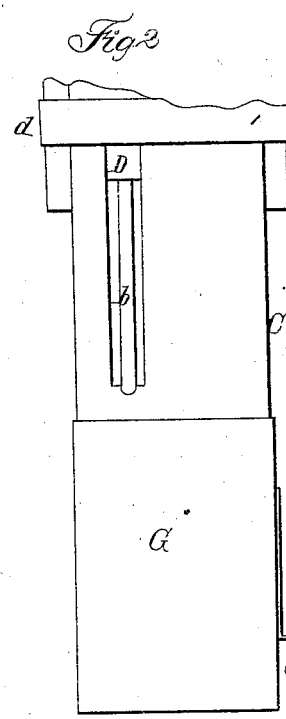

Figure 1 is a side elevation with a portion broken away to show the internal arrangement. Fig. 2 is a partial view of the back side.

A represents the hopper in which the seed is placed. This hopper has a double bottom, with a hole, $h$, in the upper one for the seed to pass to the slide D. The hopper is secured to a vertical piece, B, which is recessed longitudinally, as shown at H, the sliding bar C covering the front of said recess, and thus converting it into a spout or channel leading from the slide D to the bottom of the planter.

The sliding portion D is secured to the body B by the loops $d$, and at the bottom works within the loop or cap G, which serves to form one side of the channel when the bar C is raised, as shown in Fig. 1.

D is a slide arranged to move transversely between the bottoms of the hopper, as shown, and is provided with a hole, $m$, the size of which can be regulated by the adjustable plate $a$, the latter being held by the screw $e$. This slide D has one end protruding through a hole or slot in bar C, as shown in Fig. 2, and in this slot is located an inclined rod, $b$, which passes through the projecting end of slide D, as shown clearly in Fig. 1.

It will thus be seen that when the bar C is elevated the slide D is drawn out and brings a charge of seed from the hopper, dropping it down the channel H to the bottom of the planter, as shown in Fig. 1. When the bar C is depressed the slide D is shoved back and receives a fresh supply of seed, while the plunger E descends upon the corn in the bottom of the tube and thrusts it into the ground, the spring F yielding sufficiently to permit the plunger to shove the seed out. A guard, O, is attached to one side, near the bottom, as a guide to regulate the depth of planting.

In this class of machines one of the most essential points is to have the seed-slide work free and easy. By operating it by the inclined rod, as shown, and having the rod at one end of the slide instead of at the side, I get a very free and easy movement of the slide, all tendency to bind on the sides being thus avoided.

Having thus described my invention, what I claim is—

1. Operating the seed-slide D by means of the inclined rod $b$, when placed at one end of the slide, as shown and described.

2. The combination of the stationary bar B, having the groove H. therein, the bar C, provided with the slot and the inclined rod $b$, and slide D, all arranged and operating as set forth.

DAVID McKANNA.

Witnesses:
 I. RICHARDSON,
 ANDREW BROWN.